United States Patent [19]

Obrea

[11] Patent Number: 4,837,702

[45] Date of Patent: Jun. 6, 1989

[54] ELECTRONIC POSTAGE METER HAVING AN INFINITE LOOP LOCKOUT ARRANGEMENT

[75] Inventor: Liana Obrea, Greenwich, Conn.

[73] Assignee: Pitney Bowes Inc., Stamford, Conn.

[21] Appl. No.: 856,549

[22] Filed: Apr. 28, 1986

[51] Int. Cl.[4] ............................................. G06F 15/20
[52] U.S. Cl. ..................................... 364/466; 364/569;
364/200; 364/900; 364/464.02
[58] Field of Search ............... 364/466, 464, 569, 141,
364/200 MS File, 900 MS File; 371/12, 20, 22

[56] References Cited

U.S. PATENT DOCUMENTS 4,405,982 9/1983 Ruhnau et al. ....................... 371/12
4,551,813 11/1985 Sanbayashi et al. ................ 364/569
4,710,883 12/1987 Wilson et al. ....................... 364/466

Primary Examiner—Parshotam S. Lall
Assistant Examiner—Ellis B. Ramirez
Attorney, Agent, or Firm—Donald P. Walker; David E. Pitchenik; Melvin J. Scolnick

[57] ABSTRACT

A microcomputerized postage meter has a programmable clock for generating an interrupt output to the microcomputer in the event that it times out before it is stopped or reprogrammed. The timer is suitably programmed for the anticipated duration of the routine to enable swift recovery from the postage meter microcomputer being locked into operation in an infinite loop.

4 Claims, 7 Drawing Sheets

ELECTRONIC POSTAGE METER HAVING AN INFINITE LOOP LOCKOUT ARRANGEMENT

BACKGROUND OF THE INVENTION

The invention relates to postage meters and more particularly to electronic postage meters of the type having a microprocessor for controlling the printing of value and accounting for such printing.

Devices of this type are generally known, and are discussed, for example in U.S. Pat. No. 3,978,457. This patent discloses a system for a postal meter which includes a keyboard for the manual introduction of data corresponding to the postage to be printed and a Random Access Memory for real-time operation. Data is stored in a non-volatile memory upon power down and read into the Random Access Memory upon power up. U.S. Pat. No. 4,301,507 discloses an improvement in electronic postage meters having two or more units that are each provided with computer control and further describes the means for providing communication between units as well as with peripheral devices.

U.S. Pat. No. 4,484,307 to Quatze et al issued Nov. 20, 1984 describes a microcomputerized postage meter that provides high degrees of security and fault tolerance. However, the mechanization described includes a means for disabling the meter, which means cannot be reset except by physical access to the meter interior, and which access is only available to authorized personnel at the factory. If the fault condition is present, then even if the microcomputer is powered, the signal prevents the microcomputer from executing instructions.

In a co-pending U.S. Application, Ser. No. 710,898 entitled ELECTRONIC POSTAGE METER HAVING A STATUS MONITOR, filed Mar. 12, 1985 (now U.S. Pat. No. 4,710,883) and assigned to the assignee of the present application, there is described an improved electronic meter in which a timer, preferrably external to the microcomputer, provides a periodic interruption of the routine being executed. Upon such interruption, the microcomputer shifts to a monitor routine which monitors the meter elements, i.e. any sensors, input and outputs, and determines any changes in the status of these elements. In this improved meter, when abnormalities occur, the meter will not set a fatal error which will require the meter to be taken from service. Instead it has been found desirable that the meter be extremely fault tolerant and that a reset condition be implemented to allow the meter to recover from various abnormalities in operation which previously would require the machine to set a fatal error. While this system works well, it has been found that if the program under which the microcomputer is operating were to be locked into an infinite loop in which the normal interrupts were disabled, hardware fault detection devices would be fooled by the continuous operation, which would from all indications be proper operation, except that the meter, of course, will not provide its essential services. Thus it was found that it is important to recognize when the program becomes locked into an infinite loop, that is, as herein defined, a succession of repetitive program steps through which the microprocessor would continuously cycle unless interrupted by external input.

Software control arrangements are known in which interrupts are provided in a periodic basis. In these watchdog timers there is an independent timing circuit which generates a non-maskable interrupt after timeout or, alternatively, a non-maskable interrupt is sent at regular intervals and verified for proper operation. A problem occurs in these arrangements in that long intervals may occur before the error is discovered.

U.S. Pat. No. 4,298,982 entitled FAULT-TOLERANT INTERFACE CIRCUIT FOR PARALLEL DIGITAL BUS issued to Auerbach on Nov. 3, 1981 describes a method and apparatus for detecting and correcting a stuck condition on bus lines. Suzuki et al, U.S. Pat. No. 4,453,210 entitled MULTIPROCESSOR INFORMATION PROCESSING SYSTEM HAVING FAULT DETECTION FUNCTION BASED UPON PERIODIC SUPERVISION OF UPDATED FAULT SUPERVISING CODES describes a program having an additional function to detect faults occurring in various processors of a multiprocessor system. A counter is provided for each of the processors for holding an associated fault supervising code. The code stored in the counter is periodically updated by the associated processor while the update status of the code is supervised on a cycle longer than the cycle of the updating period. In accordance with this reference, if a fault occurs in one of the processors, the fault supervising code in correspondence with that processor will not be updated and thus the faulty processor can be detected by periodically noting the update status of the fault supervising codes.

U.S. Pat. No. 3,626,206 to Stebbens entitled CIRCUIT MEANS FOR CYCLICALLY MONITORING AND INDICATING THE CONDITION OF A FUNCTION shows a stepping chain-type digitizer for monitoring the condition of a function and for converting this condition into true and false conditions. These outputs control inhibitor gates in the stages of a normally free running ring counter. Any stage of the ring counter controlled by the step in the selected condition remains in the "on" position after the counter advances to turn it "on", and thereby stops any further advance of the ring counter. The stage of the ring counter which remains locked in the "on" position provides an indication of the conditions of the monitored functions.

SUMMARY OF THE INVENTION

In accordance with the invention described herein, if the postage meter program enters a routine which, under a particular condition, includes an infinite loop in which the other external interrupts are disabled, an external watch-dog timer, which comprises an independent programmable timing circuit will provide a signal acrtivating a non-maskable interrupt to the CPU. Each routine of the microprocessor program may if desired, include a timer reset routine for the watch-dog timer so that during the course of normal operation, the CPU non-maskable interrupt will never occur. However, if an infinite loop occurs, the routine will not reset the programable timer of the watch-dog and the counter will count to its end point and then generate a non-maskable interrupt to reset the microprocessor. In particular, in accordance with the invention, the programmable timer is settable for a run time corresponding to the length of the particular routine so as to enable the self-monitoring of an error to occur within the initial operating cycles of the next routine.

BRIEF DESCRIPTION OF THE DRAWINGS

In order that the invention will be more clearly understood, it will now be described in greater detail in conjunction with the drawing, wherein:

FIG. 4 is a flow chart illustrating the interrupt service routine for resetting the watchdog timer.

DETAILED DESCRIPTION OF THE INVENTION

Figure 1:
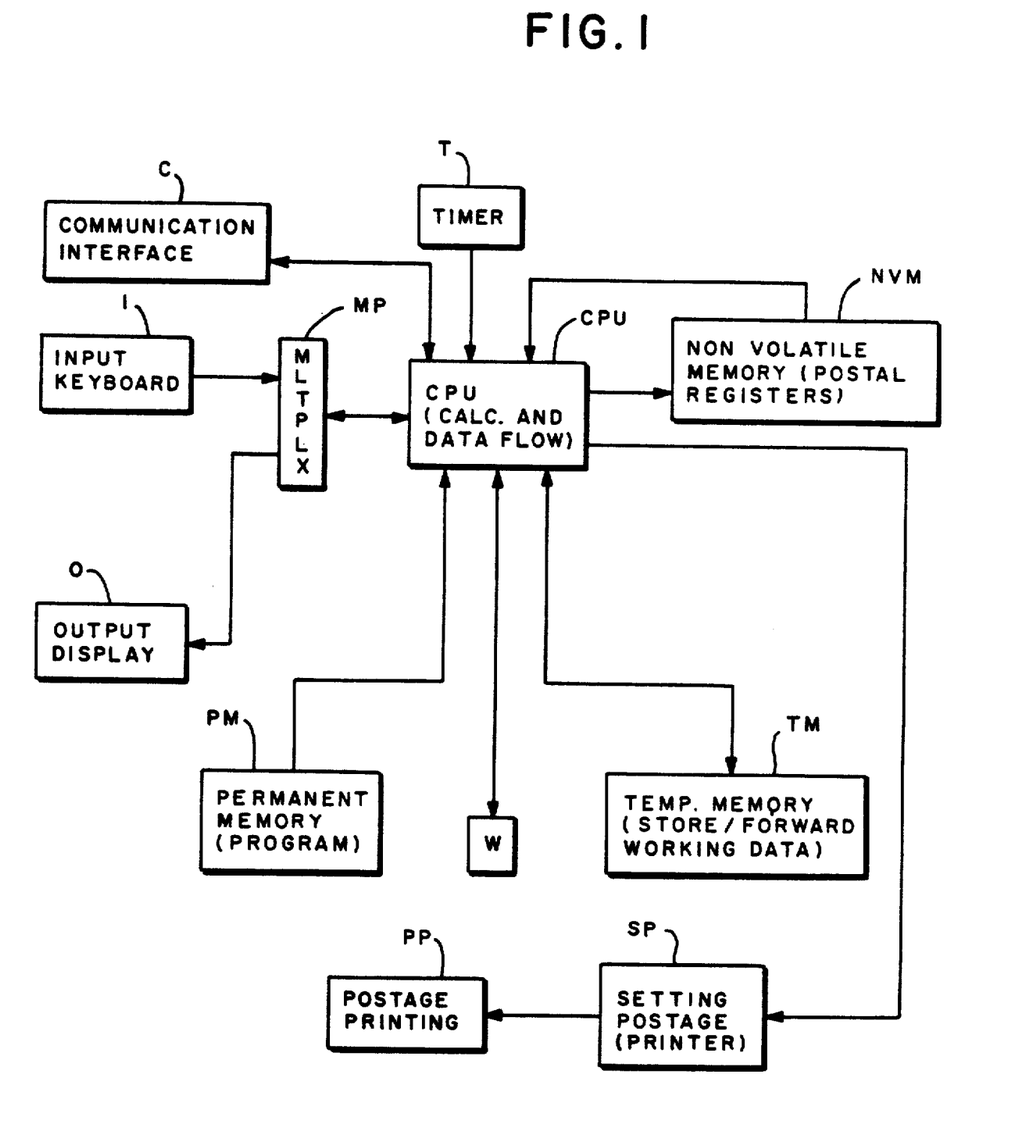
FIG. 1 is a block diagram of a postal meter which may incorporate the system of the present invention.

FIG. 1 is a block diagram of an electronic postal meter incorporating the invention. Suitable meters of the type in which the invention may be utilized are described in U.S. Pat. No. 3,978,457 and 4,301,507, the disclosures of which are specifically incorporated by reference. Another particularly suitable arrangement is described in co-pending Application Ser. No. 701,802 filed Mar. 12, 1985 entitled POSTAGE METER WITH NON-VOLATILE MEMORY SECURITY CIRCUIT and assigned to the Assignee of the present application.

A central processing unit, CPU, controls the calculations and data flow in the meter under control of a ROM. Data and commands are read from the input keyboard (I) and other data may be displayed (O) as requested on a display in conventional manner through multiplexer (MP). Additionally as described in U.S. Pat. No. 4,301,507 data and commands may be received from and transmitted to other units through a communications interface shown at "C". Real-time accounting is accomplished in a random access memory (RAM) indicated at TM with sensitive data being transferred to an NVM or a plurality of NVM's. The CPU also communicates commands for setting printwheels (block SP) and for printing of postage (PP) under the control of the program in the ROM. In co-pending Application Ser. No. 710,898 filed Mar. 12, 1985 (now U.S. Pat. No. 4,710,883) and assigned to the Assignee of the present application, there is described an advantageous routine for the control of the operation of the postage meter. In this improved postage meter, the external timer circuit T is incorporated to provide a periodic interrupt signal to the CPU. The external timer maybe any conventional clock circuit, suitably crystal controlled, to provide an output signal, conveniently at every 2.5 milliseconds to interrupt the routine being executed by the CPU. The status of all elements of the meter is monitored during thisinterrupt and the various tasks to be done by the meter are queued in an appropriate order. The interrupted routine then reacquires control of the microcomputer.

Watch-dog circuits are well known, however, in accordance with the present invention, an improved watchdog arrangement is utilized to monitor the actual flow of the program to insure continuing proper execution of the program steps. A programmable timing circuit show at W provides a non-maskable interrupt to the computer, if particular conditions set by the software routine have not occurred. The timer W is conveniently implemented as shown in FIGS. 2A, 2B, 3A and 3B and for best results is incorporated as part of an LSI chip as described in co-pending Application Ser. No. 710,100 filed Mar. 12, 1985 and assigned to the Assignee of the present application.

Figure 2A:
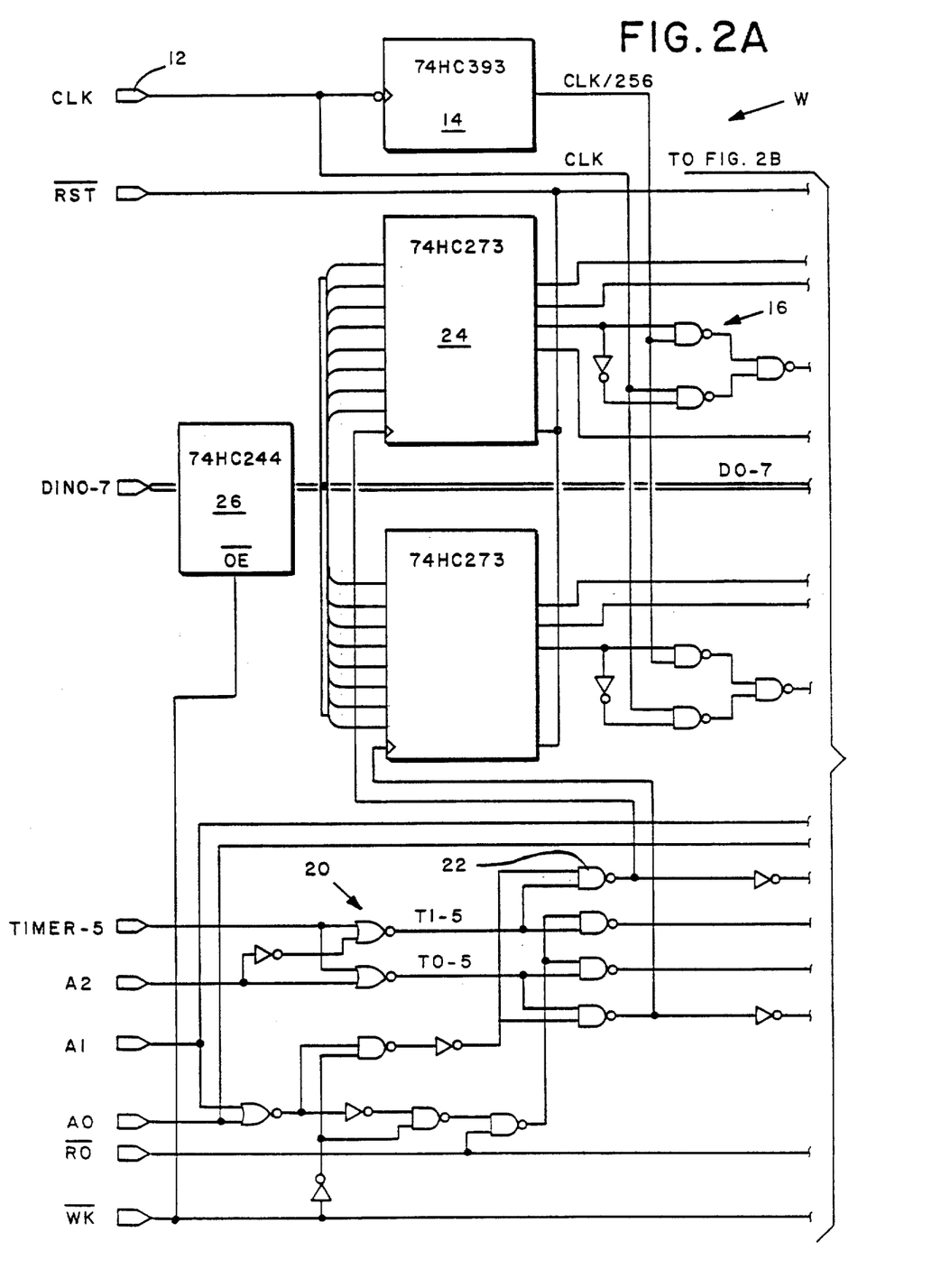
FIGS. 2A, 2B, 3A and 3B comprise a schematic diagram of a clock circuit suitable for use with the invention.
Figure 2B:
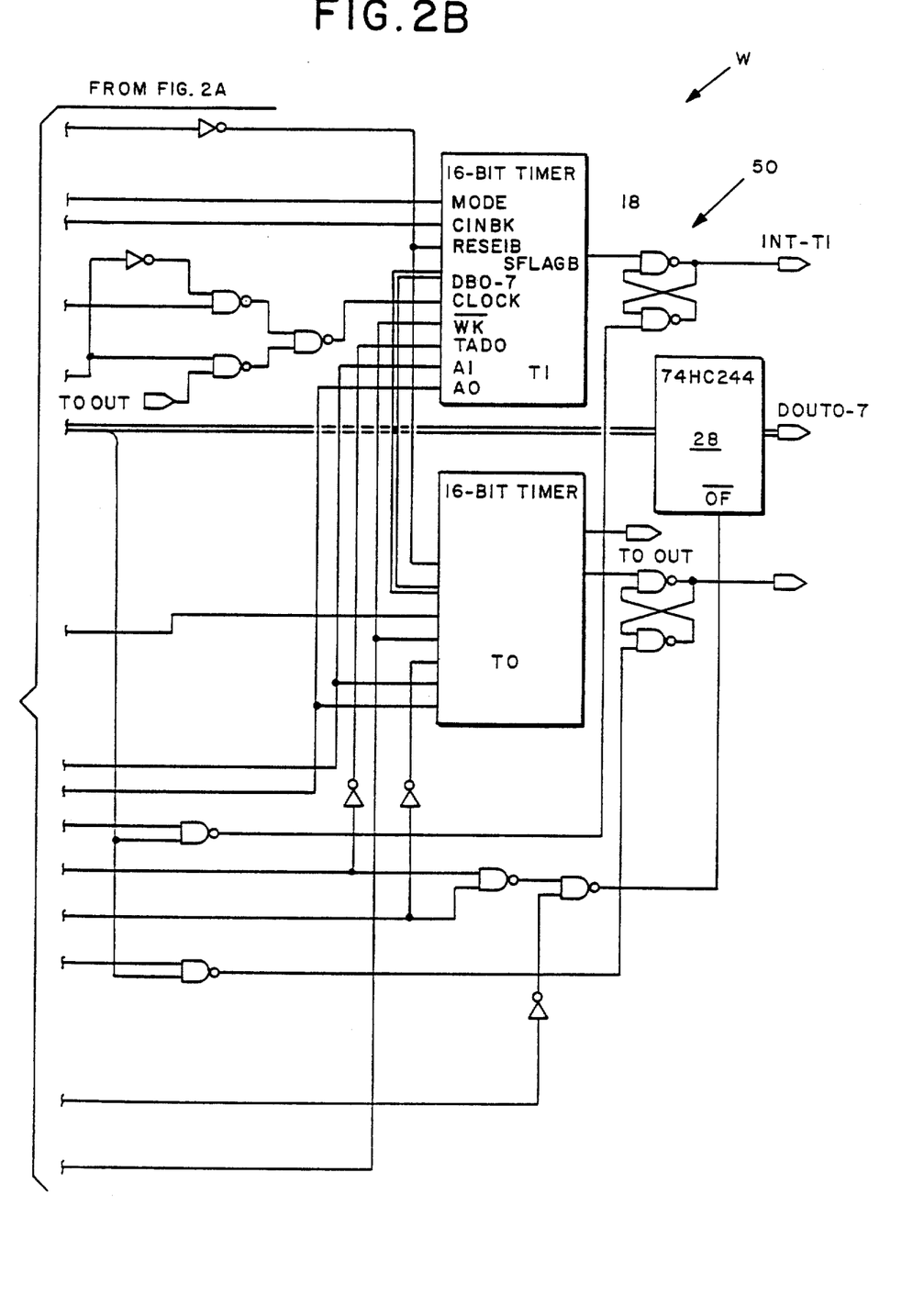
Figure 3A:
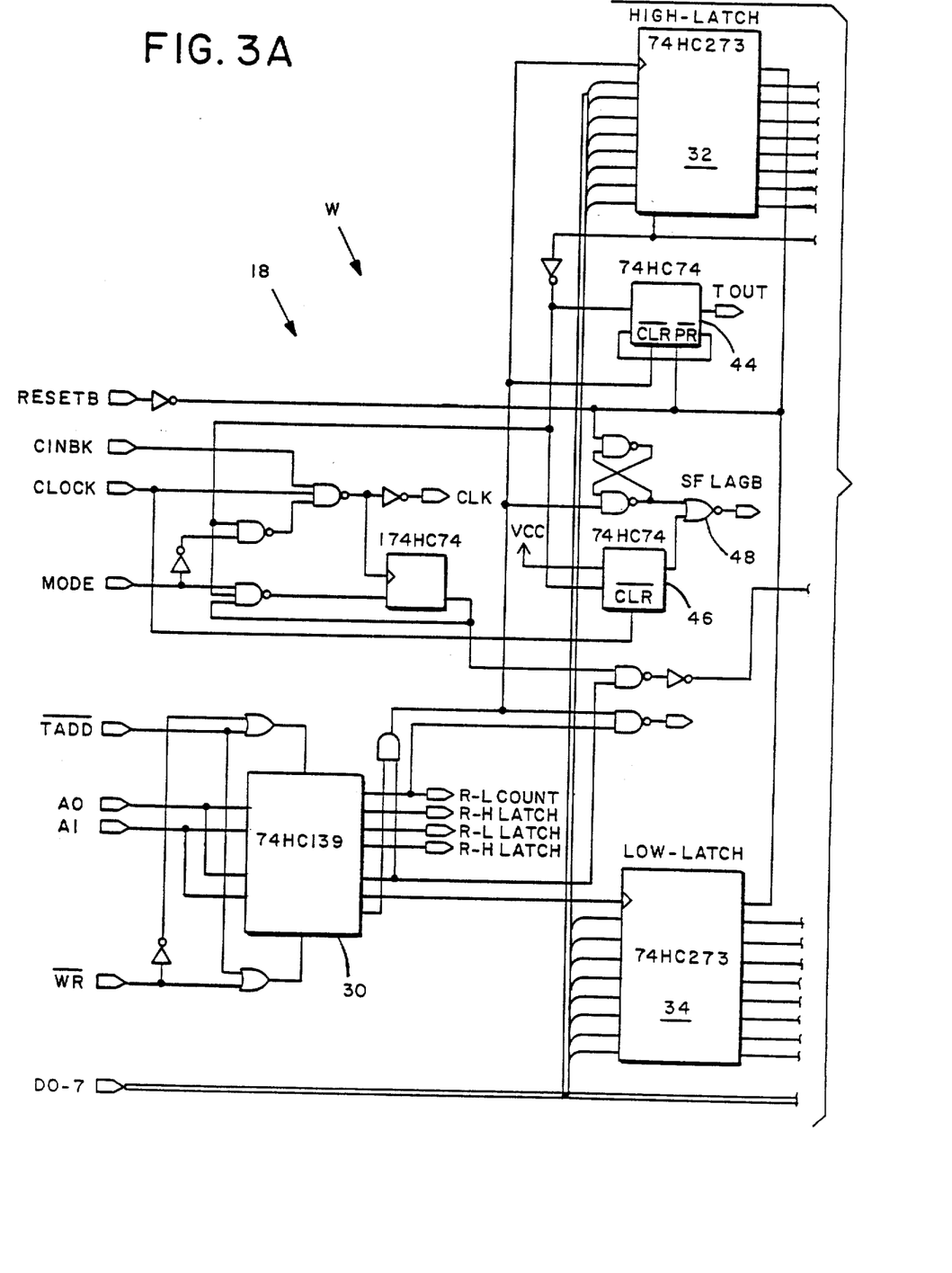
Figure 3B:
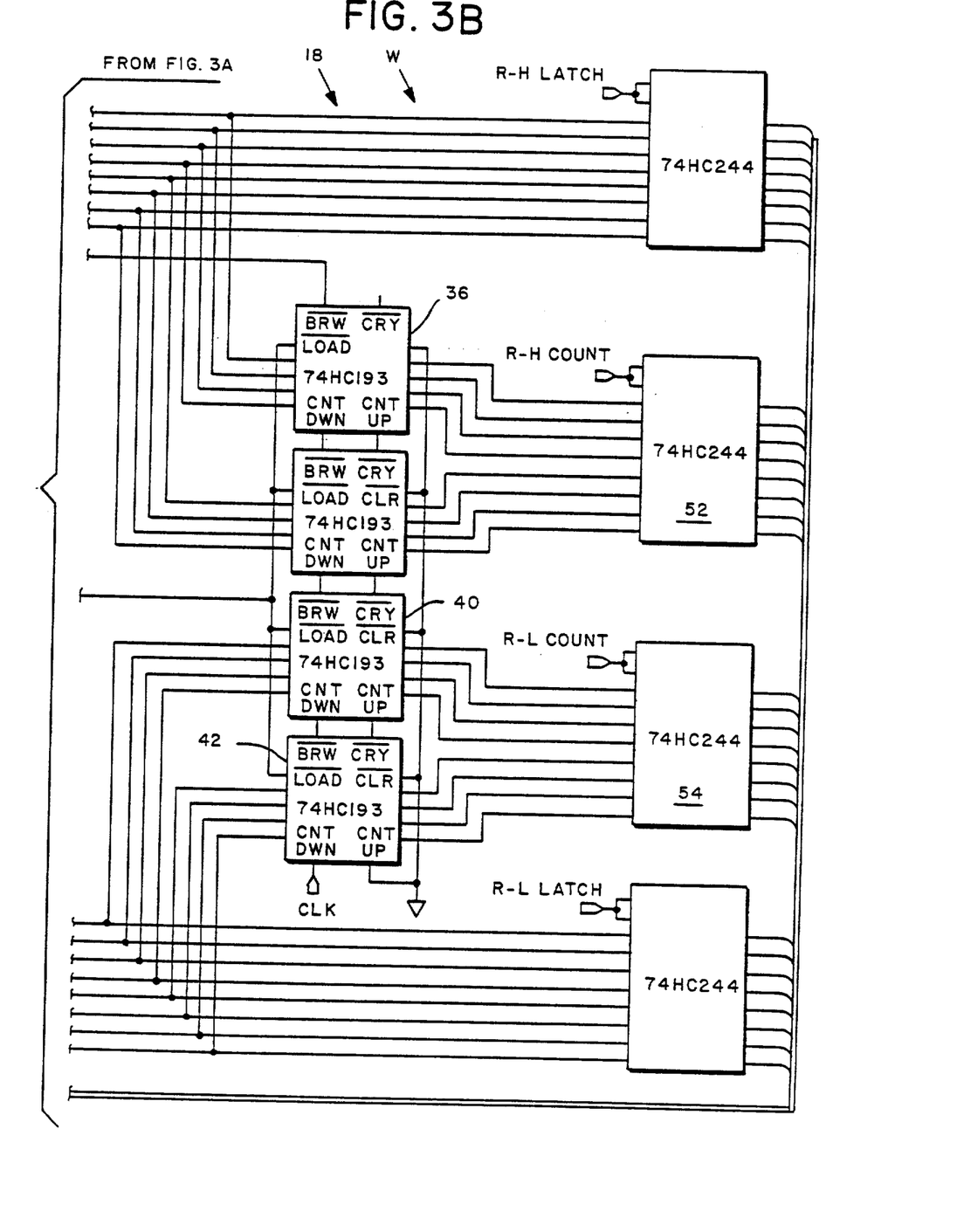

FIGS. 2 and 3 illustrate at W a dual programmable timer arrangement, either of which programmable timer is suitable for use in the invention. Since either may be used, only one will be described. The system clock generated in known manner is applied at 12 either through 8-bit Ripple Counter 14 or directly to a plurality of gates 16 for application to the clock input of block T1 (shown as 18) described more specifically with respect to FIG. 3A. Conveniently, the low order addresses $A_0$–$A_2$ from an address received from the CPU and a timer select signal are applied through gates 20 to latches 22 and 24 to decode the timer ports. Input data is loaded through buffer 26 and read from buffer 28 in accordance with the decoded signals, such data being read when input RD is active and being written when input WR is active.

As best seen in FIG. 3A, the decoder 30 receives the low order address signals which are decoded for selectively enabling the latches 32 and 34, which in turn under program control may be loaded into the presettable synchronous 4-bit Binary Up-down counters 36, 38, 40 and 42 counting in accordance with the clock signal. The time-out signal is taken from the borrow output of counter 36 and is fed to the D Flip Flop 44 for generating a time-out signal and also to D Flip Flop 46 whose Q output is fed to the gate 48 and flip-flop gater 50 to generate an interrupt signal INT-TI. The output of the up-down counters may be read from buffers 52 and 54. Other configurations of timers will occur to those skilled in the art. The additional features illustrated are not used in conjunction with the invention and will therefore not be further described.

Figure 4:
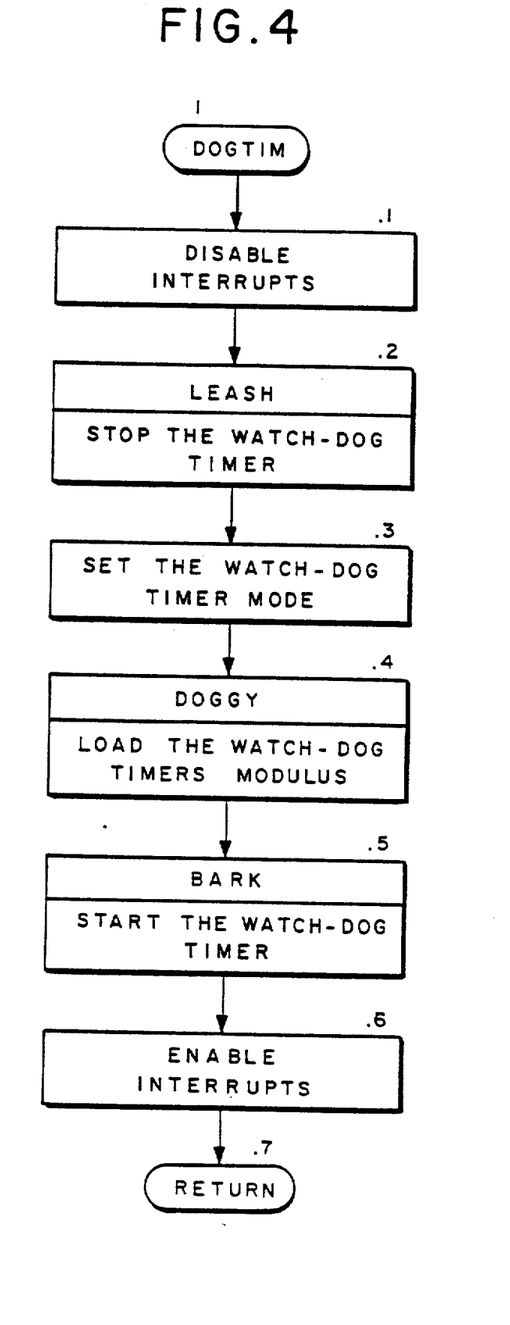
FIG. 4 is a flow chart illustrating the initializing routine in accordance with the invention for use in the electronic postage meter.

A flow chart for implementing the method in accordance is shown in FIG. 4. It is believed that the method shown in the flow chart will be easily understood by one skilled in the art.

For best results, upon power up, the watch-dog timer modulus will be set to a value which represents the expected duration of the first monitored piece of software and the timer 16 started. Before exiting from the first routine, the watch-dog timer is reloaded with the modulus of the next routine i.e., one corresponding to the expected duration of the next to be checked piece of software or to be stopped. Otherwise it will be appreciated that the timer will continue to count to its end point to generate the non-maskable interrupt signal INT-TI.

Figure 5:
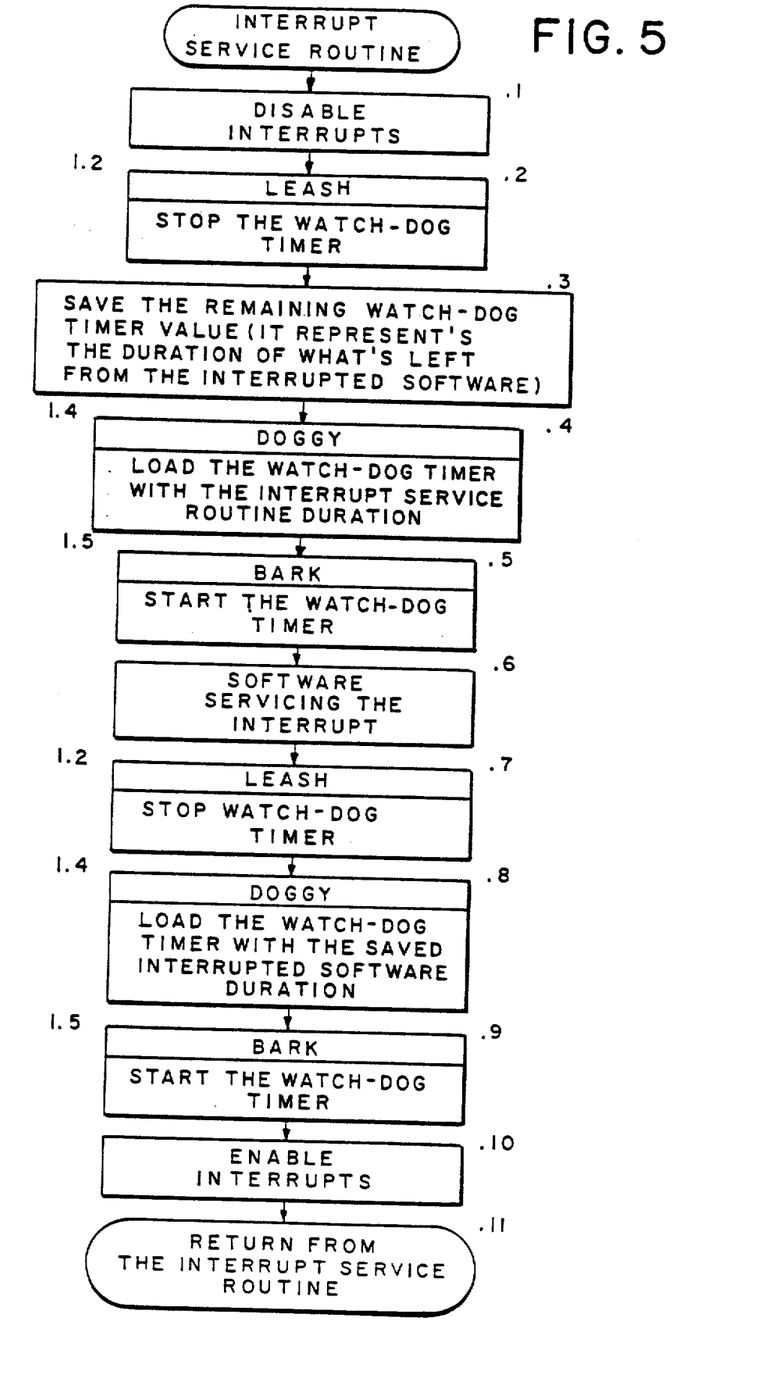

If the monitored routine enters an infinite loop, the timer will interrupt the operation of the postage meter program and a recovery operation can be called. For example, an error recovery routine could be initiated or an external reset could be provided. When the running program is interrupted by the normal and expected maskable interrupts, that is, not by the watch-dog circuit, the interrupt service routine shown in FIG. 5 will stop the timer; save the modulus value which represents the remainder of the duration of the interrrupted software; load its own modulus, that is, the duration of the service interrupt routine, and restart the timer. Before returning from the interrupt, the interrupt service routine will restore the old modulus, that is, the one corresponding to the interrupted running software.

This method of starting, loading, and stopping the watch-dog timer enables the system to detect if an infinite loop is occurring. Thus it will be appreciated that the system fault tolerance is increased and the postage meter system monitors its own performance by checking the control flow of the program.

What is claimed is:

1. A method of recovering operation in a postage meter having a microcomputer operating under control of a computer program comprising the steps of:
   (a) providing a programmable external timer operative to generate a signal upon completion of a programmed timing-interval;
   (b) programming said programmable external timer with a first watch-dog modulus corresponding to an expected duration of a first monitored program routine;
   (c) starting the timer;
   (d) sequentially programming said programmable external timer with a modulus corresponding to an expected duration of the next-in-sequence of a plurality of program routines as such one of said routines is to be executed by said postage meter microcomputer whereby the timer is reset to the value corresponding to the expected duration of the to-be executed routine, said timer providing said signal in the event that the timer times out prior to the reprogramming of the timer.

2. The method of claim 1 wherein the timer is stopped for a predetermined duration.

3. The method of claim 1 wherein said timer is a portion of an LSI chip.

4. A method of recovering operation in a postage meter having a microcomputer operating under control of a computer program comprising the steps of:
   (a) providing a programmable external timer operative to generate a signal upon completion of a programmed timing-interval;
   (b) programming said programmable external timer with a first watch-dog modulus corresponding to an expected duration of a first monitored program routine;
   (c) starting the timer;
   (d) interrupting the routine;
   (e) saving the modulus indicative of the remainder of the first programmed duration;
   (f) entering a second modulus for performing an interrupt routine;
   (g) exiting the interrupt routine;
   (h) restoring the saved modulus to the programmable timer; and
   (i) sequentially programming said programmable external timer with a modulus corresponding to an expected duration of the next-in-sequence of a plurality of program routines as such one of said routines is to be executed by said postage meter microcomputer whereby the timer is reset to the value corresponding to the expected duration of the to-be executed routine, said timer providing said signal in the event that the timer times out prior to the reprogramming of the timer.

* * * * *